United States Patent [19]

Griffiths et al.

[11] Patent Number: 5,179,825

[45] Date of Patent: Jan. 19, 1993

[54] SAND RAKE

[76] Inventors: Warren J. Griffiths, 18145 Solidad #87, Canyon Country, Calif. 91351; Robert L. Gentile, 23412 Magic Mountain Pkwy., Unit 1103, Valencia, Calif. 91355

[21] Appl. No.: 774,326

[22] Filed: Oct. 10, 1991

[51] Int. Cl.⁵ ............................................. A01D 7/06
[52] U.S. Cl. .............................. 56/400.05; 56/400.21
[58] Field of Search ........... 56/400.04, 400.05, 400.07, 56/400.21, 400.16, 400.01

[56] References Cited

U.S. PATENT DOCUMENTS

| | | | |
|---|---|---|---|
| 1,678,695 | 7/1928 | Ferguson | 56/400.01 |
| 3,440,810 | 4/1969 | Rhyme | 56/400.06 |
| 4,224,786 | 9/1980 | Langlie et al. | 56/400.01 |
| 4,741,150 | 5/1988 | Saksun | 56/400.21 |

*Primary Examiner*—Terry Lee Melius
*Attorney, Agent, or Firm*—Roger A. Marrs

[57] ABSTRACT

A rake is disclosed herein for smoothing and contouring sand which includes an elongated base having a centrally located handle normal to the base and a plurality of rake teeth in a row outwardly projecting from the base in a staggered relationship from one end of the base to its other end. The base is provided with a smoothing groove adjacent to the row of teeth between the opposite base ends and the base is reinforced at the socket receiving the end of the handle.

7 Claims, 1 Drawing Sheet

SAND RAKE

BACKGROUND OF THE INVENTION

1. Field of the Invention

The present invention relates to the field of sand rakes, and more particularly to a novel sand rake capable of disrupting surface tension of the sand and smoothing the sand in a manner suitable for playing the game of golf.

2. Brief Description of the Prior Art

In the past, it has been the conventional practice to smooth and distribute sand over a sand pit by the use of a rake. Such a rake is disclosed in U.S. Pat. No. 4,741,150 which discloses a member carrying a plurality of teeth which may be drawn over the surface of a sand pit when pulled by means of a handle. Problems and difficulties have been encountered when employing such a rake which stem largely from the fact that surface tension of the sand is not adequately broken or disturbed and subsequent smoothing of the sand by the member carrying the teeth is uneven and sometimes results in bumps or small sand hills.

Furthermore, prior rakes are expensive and replacement is uneconomical when they are broken or stepped upon when carelessly strewn about a golf course. Prior sand rakes lack reinforcement and strength in vital areas which are normally used for load transmission during the raking procedure. This lack of reinforcement usually results from the use of hollow tubes which require caps or the like. Another problem resides in the inability of prior sand rakes to completely smooth the surface of a sand trap or pit after surface tension has been broken. The regular alignment of teeth on conventional rakes along with a completely circular transverse cross-section of the member carrying the teeth fails to completely smooth the sand as the rake is drawn over the sand surface. Small irregularities and lumps appear which disrupt a golf player's ball from rolling smoothly and in a desired direction.

Therefore, a long-standing need has existed to provide a novel sand rake having the capability of breaking surface tension and completely smoothing the sand as the rake is drawn thereover. The rake should be of sufficient reinforcement so as to prevent easy breakage or damage due to mishandling of the rake.

SUMMARY OF THE INVENTION

Accordingly, the above problems and difficulties are obviated by the present invention which provides a novel sand rake having an elongated base which is of non-circular transverse section and which carries a plurality of outwardly projecting teeth arranged in an irregular row extending from one end of the base to its opposite end. The teeth are characterized as being offset from adjacent teeth so that the angular displacement of adjacent teeth is different. Furthermore, the base includes an elongated groove immediately ahead of the teeth which serves to gather sand as the rake is being drawn over the sand trap or pit and more evenly and smoothly distributes the sand as the rake passes over the broken surface. Reinforcement means are provided between the member and a handle which is used for drawing the tooth base over the sand. Such reinforcement means may take the form of added material at the joint where handle connects with the base.

Therefore, it is among the primary objects of the present invention to provide a novel sand rake which will more evenly and smoothly smooth sand as the rake is drawn over the surface thereof.

Another object of the present invention is to provide a novel sand rake which is reinforced for added strength and which is economical to manufacture as well as use.

Still a further object of the present invention is to provide a novel sand rake having an elongated base with a smoothing groove provided therein immediately ahead of a row of teeth which are irregularly disposed so as to break up surface tension and provide a more even and smooth distribution of sand over the surface of a sand pit or trap.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

DESCRIPTION OF THE PREFERRED EMBODIMENT

Figure 1:
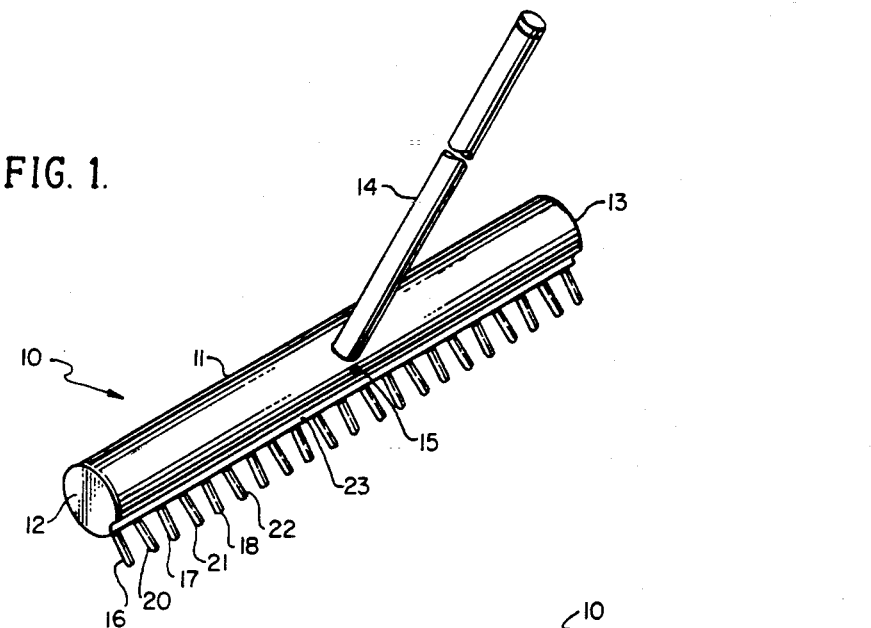
FIG. 1 is a rear perspective view of the novel sand rake incorporating the present invention.
Figure 2:
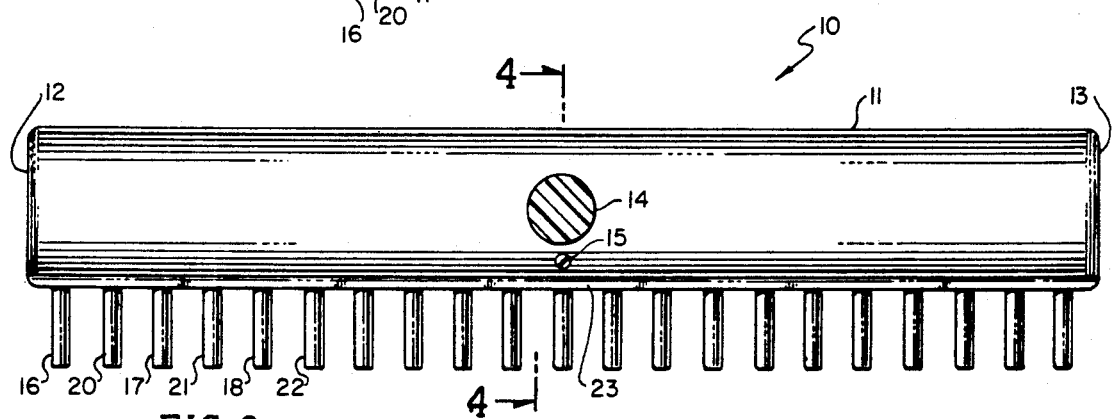
FIG. 2 is an enlarged cross-sectional view of the rake base and rake teeth as shown in FIG. 1.

Referring to FIG. 1, the novel sand rake of the present invention is illustrated in the direction of arrow 10 which includes an elongated member or base 11 having its opposite ends sealed by caps 12 and 13 respectively. An elongated handle 14 is fixedly secured to the midsection of the base 11 midway between its opposite ends and extends perpendicularly away from the member. Preferably, the handle is of solid material so that it is rigid and strong. The handle is secured to the base by means of a screw 15.

It is noted that a plurality of teeth are provided and carried by the base 11 so that a row is provided in spaced-apart relationship with respect to the handle 14. It is to be particularly noted that the row of teeth provides for the staggering of the teeth so that alternate teeth are angularly offset with respect to adjacent teeth. For example, teeth such as identified by numerals 16, 17 and 18 are arranged in a linear row with respect to themselves but are offset from adjacent teeth identified by numerals 20, 21 and 22. This arrangement of alternating or staggered teeth is carried out along the full row of teeth between the opposite base ends 12 and 13.

It is also to be particularly noted that the member or base 11 includes an elongated trough or groove, identified by numeral 23, which extends between the opposite ends 12 and 13 immediately adjacent to the row of teeth. The trough or groove is situated between the row of teeth and the handle 14 so it may be said that the trough or groove is on the back side or rear of the base 11 so as to immediately engage with the sand as shown more clearly in FIG. 3.

Figure 3:
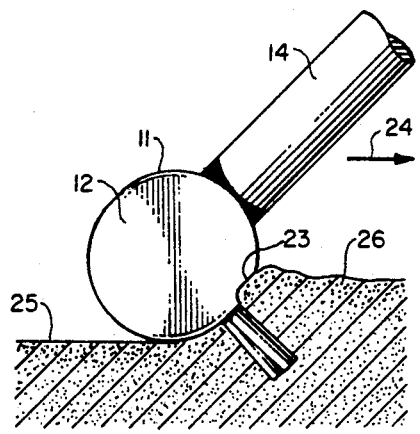
FIG. 3 is a side elevational view of the rake showing the smoothing of sand by the smoothing groove in the base.

Referring now in detail to FIG. 3, it can be seen that when in use, sand will be piled into the groove 23 after the surface tension has been broken by the plurality of staggered teeth. As the rake is drawn in the direction of arrow 24, the teeth will not only break up the surface tension but will loosen the sand at the surface so that proper gathering may occur in the groove 23. Once the rake has been drawn in the direction of arrow 24, a smooth sand surface results and such a smooth surface is indicated by numeral 25.

FIG. 3 further illustrates that the base 11 is non-circular in cross-section and may be said to be substantially oval. Such construction and configuration adds greatly to the smoothing of the sand as the member is drawn over the sand surface. As the rake base is moved over the rough and irregular surface, identified by numeral 26, the trailing smooth sand 25 results.

Figure 4:
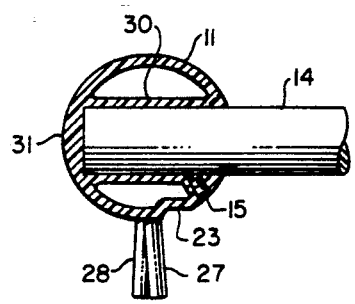
FIG. 4 is a transverse cross-sectional view of the rake shown in FIG. 2 as taken in the direction of arrows 4—4 thereof.

Referring now in detail to FIG. 4, the staggered row of teeth is illustrated wherein tooth 27 is at a different angle from the tooth 28 which is adjacent thereto in the row. Also, it can be seen that the trough 23 is immediately ahead of the row of teeth. The member or base 11 is provided with a receptacle 30 into which the terminating end of the solid handle 14 is disposed and held in position by means of the screw 15. The base of receptacle 30 is substantially thickened, as shown by numeral 31, which adds to the strength of the rake. The added molded material present by the receptacle 30 greatly stiffens the rake and strengthens the joint.

Therefore, in view of the foregoing, it can be seen that Applicant's improvement which breaks the surface tension followed by gathering of sand in the trough and smoothing of the sand due to the non-circular shape of the base 11.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A hand rake for smoothing a surface of granular material comprising the combination of:
   an elongated base having opposite ends;
   a handle carried on said base between said opposite ends;
   a row of teeth outwardly projecting from said base extending between said base opposite ends and wherein said teeth are staggered in angular relationship with respect to alternate adjacent teeth; and
   said base provided with an elongated groove extending between said opposite ends extending in parallel with and immediately above said row teeth.

2. The invention as defined in claim 1 including:
   said elongated handle having one end secured to said base midway between said opposite base ends and normal to said base;
   said handle separated from said row of staggered teeth by said groove.

3. The invention as defined in claim 2 wherein:
   said base is non-circular in cross-section with the cross-section of said base being substantially oval.

4. The invention as defined in claim 3 wherein:
   said row of staggered teeth includes alternate teeth angled outwardly from said base at a different angle from adjacent ones of said teeth.

5. The invention as defined in claim 3 wherein:
   said teeth in said row are in irregular alignment across said base so as to provide a pair of rows differing in angular displacement with respect to said base.

6. The invention as defined in claim 5 wherein:
   said base includes a receptacle for insertably receiving said handle;
   said receptacle integrally formed with said base to reinforce and support said handle.

7. The invention as defined in claim 6 wherein:
   said handle is solid and composed of plastic material.

* * * * *